US011736276B2

(12) United States Patent
Ruane et al.

(10) Patent No.: US 11,736,276 B2
(45) Date of Patent: *Aug. 22, 2023

(54) DELEGATION OF CRYPTOGRAPHIC KEY TO A MEMORY SUB-SYSTEM

(71) Applicant: Micron Technology, Inc., Boise, ID (US)

(72) Inventors: James Ruane, San Jose, CA (US); Robert W. Strong, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/690,660

(22) Filed: Mar. 9, 2022

(65) Prior Publication Data

US 2022/0200793 A1   Jun. 23, 2022

Related U.S. Application Data (63) Continuation of application No. 16/677,306, filed on Nov. 7, 2019, now Pat. No. 11,296,872.

(51) Int. Cl.
*H04L 29/06* (2006.01)
*H04L 9/08* (2006.01)
(Continued)

(52) U.S. Cl.
CPC .......... *H04L 9/0825* (2013.01); *H04L 9/0643* (2013.01); *H04L 9/3249* (2013.01); *H04L 9/3271* (2013.01)

(58) Field of Classification Search
CPC .... G06F 21/602; G06F 21/604; G06F 16/182; G06F 21/64; H04L 9/085; H04L 9/0861;
(Continued)

(56) References Cited

U.S. PATENT DOCUMENTS

| 10,356,088 B1 | 7/2019 | Peddada et al. |
| 10,637,793 B1 | 4/2020 | Scott et al. |

(Continued)

FOREIGN PATENT DOCUMENTS

| CN | 114830595 | 7/2022 |
| DE | 112020005459 T5 | 9/2022 |

(Continued)

OTHER PUBLICATIONS

"International Application Serial No. PCT/US2020/059489, International Search Report dated Mar. 2, 2021", 3 pgs.

(Continued)

*Primary Examiner* — Yogesh Paliwal
(74) *Attorney, Agent, or Firm* — Schwegman Lundberg & Woessner, P.A.

(57) ABSTRACT

A key delegation request is received from a host system. The key delegation request includes a new public key. A challenge is generated based on the new public key and a root public key, and the challenge is provided to the host system responsive to the request. A first and second digital signature are received from the host system. The first digital signature is generated by cryptographically signing the challenge using a new private key corresponding to the new public key and the second digital signature is generated by cryptographically signing the challenge using a root private key corresponding to the root public key. The first digital signature is validated using the new public key and the second digital signature is validated using the root public key. Based on successful validation of both signatures, the new public key is utilized in one or more cryptographic operations.

20 Claims, 6 Drawing Sheets

(51) Int. Cl.
*H04L 9/32* (2006.01)
*H04L 9/06* (2006.01)

(58) Field of Classification Search
CPC . H04L 9/0816; H04L 63/166; H04L 63/0428; H04L 2463/062; H04L 2463/0643; H04L 63/0435; H04L 9/0825; H04L 9/3239; H04L 2209/38; H04L 9/3249; H04L 9/3271; G09C 1/00
See application file for complete search history.

(56) References Cited

U.S. PATENT DOCUMENTS

| | | | |
|---|---|---|---|
| 11,296,872 B2 | 4/2022 | Ruane et al. | |
| 2004/0073801 A1* | 4/2004 | Kalogridis | G06F 21/305 |
| | | | 713/176 |
| 2006/0173787 A1 | 8/2006 | Weber et al. | |
| 2006/0242065 A1* | 10/2006 | Jogand-Coulomb | G06F 21/62 |
| | | | 705/50 |
| 2010/0242102 A1 | 9/2010 | Cross et al. | |
| 2014/0281554 A1* | 9/2014 | Maletsky | H04L 9/3268 |
| | | | 713/175 |
| 2016/0352516 A1 | 12/2016 | Oberheide et al. | |
| 2017/0250797 A1* | 8/2017 | Goldstein | H04L 9/3247 |
| 2017/0272415 A1 | 9/2017 | Zhao et al. | |
| 2018/0254907 A1 | 9/2018 | Gasparini | |
| 2021/0143990 A1 | 5/2021 | Ruane et al. | |

FOREIGN PATENT DOCUMENTS

| | | |
|---|---|---|
| WO | WO-02058357 A2 | 7/2002 |
| WO | WO-2018151426 A1 | 8/2018 |

OTHER PUBLICATIONS

"International Application Serial No. PCT/US2020/059489, Written Opinion dated Mar. 2, 2021", 4 pgs.

"International Application Serial No. PCT US2020 059489, International Preliminary Report on Patentability dated May 19, 2022", 6 pgs.

"Chinese Application Serial No. 202080086771.0, Office Action dated Jan. 13, 2023", w/o English Translation, 5 pgs.

* cited by examiner

DELEGATION OF CRYPTOGRAPHIC KEY TO A MEMORY SUB-SYSTEM

PRIORITY APPLICATION

This application is a continuation of U.S. application Ser. No. 16/677,306, filed Nov. 7, 2019, which is incorporated herein by reference in its entirety.

TECHNICAL FIELD

Embodiments of the disclosure relate generally to memory sub-systems, and more specifically, to delegation of a cryptographic key to a memory sub-system.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to delegation of cryptographic key to a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

A memory sub-system can store confidential, proprietary, or other sensitive information that should only be accessed by specifically authorized users such as field engineers. To protect sensitive information stored by the memory sub-system, Public Key Infrastructure (PKI) is often used to cryptographically sign and verify sensitive information. In this manner, trust of origin and the capability to detect unauthorized modification can be derived. Example uses of PKI include firmware signing and verification as well as authorization of commands that can compromise security of a memory sub-system.

In certain implementations, a public key of an asymmetric key pair (also referred to herein as "cryptographic keys") is provisioned to a memory sub-system by an original equipment manufacturer (OEM) prior to shipment to customers while the private key is secured by a hardware security module (HSM) of a secure system (e.g., operated the OEM) that is external to and independent of the memory sub-system. The public key initially provisioned to the memory sub-system may be referred to as a "root" public key while the corresponding private key stored by the HSM of the secure server may be referred to as a "root" private key. Rivest-Shamir-Adleman (RSA) PKI operations allow for encryption and decryption operations as well as signature generation and verification operations. Data encrypted by the public key can only be decrypted by the corresponding private key.

In some situations, it may be desired to change the public key used by the memory sub-system. That is, it may be desired to have the memory sub-system use a new public key to encrypt and/or verify sensitive information rather than the root public key. For example, it may be desirable to have the memory sub-system utilize a new public key that corresponds to a new private key stored by a portable HSM (e.g., included in a laptop) rather than the HSM of the secure server. In another example, it may be desirable to have the memory sub-system utilize a new public key that corresponds to a new private key stored by a smart card that includes a crypto-library. In still another example, it may be desirable to have the memory sub-system utilize a new public key that corresponds to a new private key stored by the same HSM of the secure server. In any event, the new public key must be delegated to the memory sub-system in a secure manner that preserves a web of trust to avoid creating security vulnerabilities that may be exploited to gain unauthorized access of sensitive information stored by the memory sub-system.

Aspects of the present disclosure address the above and other issues by implementing a secure protocol for delegation of a new cryptographic key to a memory sub-system. As noted above, an asymmetric key pair comprising a root public key and a root private key is generated, and a memory sub-system controller is initially provisioned with the root public key while a secure server stores the root private key. To delegate a new public key to the memory sub-system, a user of a host system (e.g., a field application engineer (FAE)) may cause the host system to issue a new key delegation request to the memory sub-system controller. The new key delegation request includes the new public key to be delegated to the memory sub-system controller. In response to receiving the request, the memory sub-system controller generates and returns a challenge to the host system that includes the new public key, the root public key, and unique data (e.g., a random number and/or device unique data). The unique data may, for example, include device unique data and/or a random number that is unique and differs from subsequently generated challenges. The unique data included in the challenge ensures that the challenge can only be generated by the memory sub-system controller and prevents the challenge from being reproduced by other devices. The unique data also prevents the challenge response from being replayed to the device at a later time.

To cause the memory sub-system controller to accept and use the new public key in cryptographic operations, the user of the host system must have the challenge signed by both the root private key and a new private key corresponding to the new public key and provide the two digital signatures to the memory subsystem. These two digital signatures prove that the OEM approves of the new key delegation to the memory sub-system and that the user has possession of the new private key. To obtain these signatures, the user of the host system may submit a first signature request to the secure server that stores the root private key and a second signature request to a key delegation secure execution environment (e.g., a portable HSM, a smart card, or secure server).

Responsive to the first signature request, the secure server returns a first digital signature generated by cryptographically signing the challenge with the root private key, and based on the second signature request, the key delegation secure execution environment returns a second digital signature generated by cryptographically signing the challenge with the new private key. The user of the host system provides the two digital signatures to the memory sub-system controller via the host system, and the memory sub-system controller, in turn, validates the two digital signatures using the root public key and new public key, respectively. Based on successful validation of the two signatures, the memory sub-system controller copies the new public key to memory and thereafter may use the new public key in one or more cryptographic operations.

Utilizing the security protocol described above reduces vulnerabilities in a memory sub-system by preventing access of sensitive information by unauthorized parties. Additionally, the security protocol provides a secure mechanism for authorized personnel to securely access sensitive information from a memory sub-system while enabling use of cryptographic keys other than the root key initially provisioned to the memory sub-system.

Figure 1:
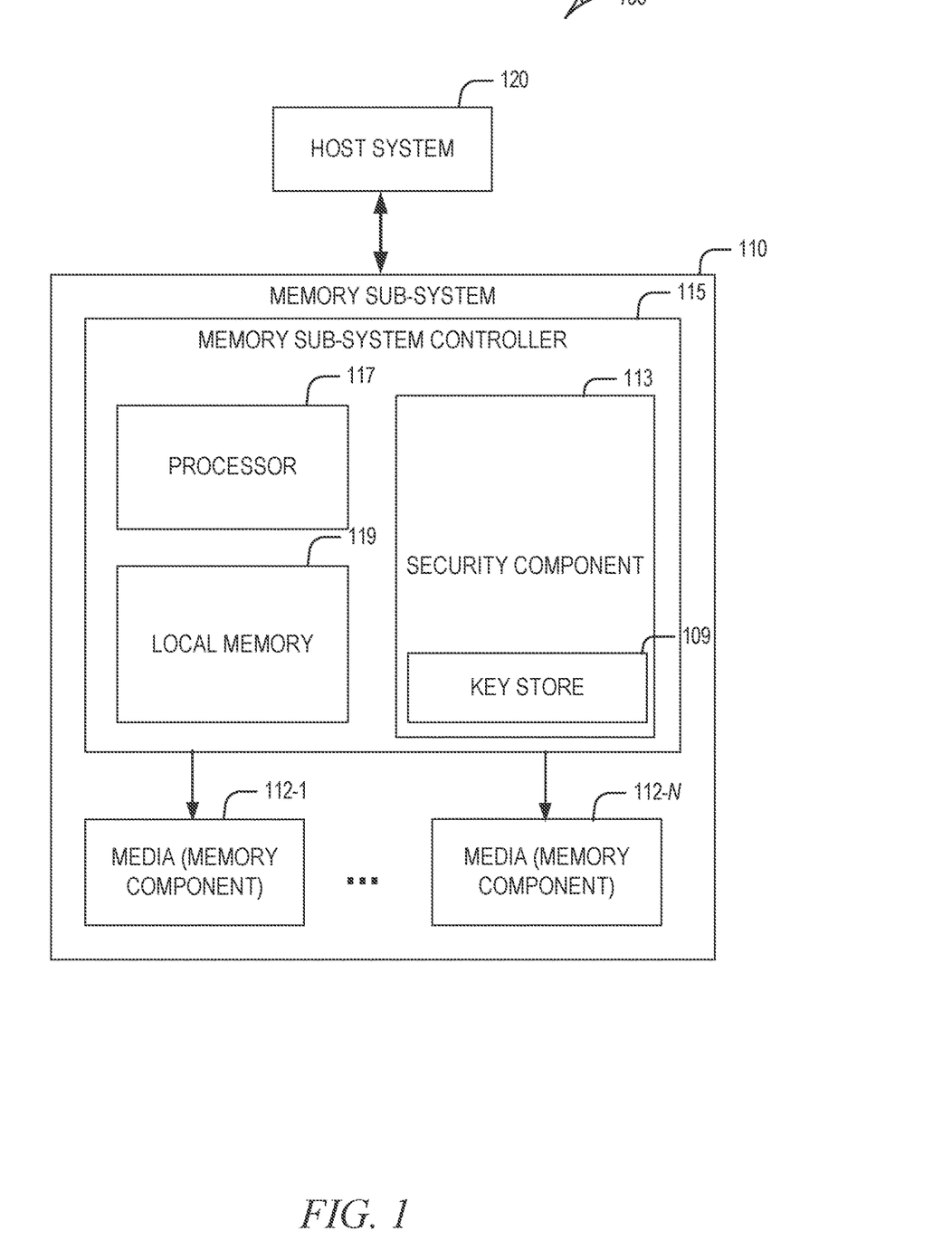
FIG. 1 illustrates an example computing environment that includes a memory sub-system, in accordance with some embodiments of the present disclosure.

FIG. 1 illustrates an example computing environment 100 that includes a memory sub-system 110, in accordance with some embodiments of the present disclosure. The memory sub-system 110 can include media, such as memory components 112-1 to 112-N (also hereinafter referred to as "memory devices"). The memory components 112-1 to 112-N can be volatile memory components, non-volatile memory components, or a combination of such. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS), and so forth. The physical host interface can be used to transmit data between the host system 120 and the memory sub-system 110. The host system 120 can further utilize an NVM Express (NVMe) interface to access the memory components 112-1 to 112-N when the memory sub-system 110 is coupled with the host system 120 by the PCIe interface. The physical host interface can provide an interface for passing control, address, data, and other signals between the memory sub-system 110 and the host system 120.

The memory components 112-1 to 112-N can include any combination of the different types of non-volatile memory components and/or volatile memory components. An example of non-volatile memory components includes a negative-and (NAND)-type flash memory. Each of the memory components 112-1 to 112-N can include one or more arrays of memory cells such as single-level cells (SLCs), multi-level cells (MLCs), triple-level cells (TLCs), or quad-level cells (QLCs). In some embodiments, a particular memory component can include both an SLC portion and another type (e.g., MLC, TLC, QLC) of portion of memory cells. Each of the memory cells can store one or more bits of data used by the host system 120. Although non-volatile memory components such as NAND-type flash memory are described, the memory components 112-1 to 112-N can be based on any other type of memory such as a volatile memory. In some embodiments, the memory components 112-1 to 112-N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, as noted above, the memory cells of the memory components 112-1 to 112-N can be grouped to form pages that can refer to a unit of the memory component used to store data. With some types of memory (e.g., NAND), pages can be grouped to form blocks.

A memory sub-system controller 115 (hereinafter referred to as a "controller") can communicate with the memory components 112-1 to 112-N to perform operations such as reading data, writing data, or erasing data at the memory components 112-1 to 112-N and other such operations. The controller 115 can include hardware such as one or more integrated circuits and/or discrete components, a buffer memory, or a combination thereof. The controller 115 can be a microcontroller, special-purpose logic circuitry (e.g., a field-programmable gate array (FPGA), an application-specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include ROM for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112-1 to 112-N. The controller 115 can be responsible for other operations such as wear-leveling operations, garbage collection operations, error detection and error-correcting code (ECC) operations, encryption operations, caching operations, and address translations between a logical block address and a physical block address that are associated with the memory components 112-1 to 112-N. The controller 115 can further include host interface circuitry to communicate with the host system 120 via the physical host interface. The host interface circuitry can convert the commands received from the host system 120 into command instructions to access the memory components 112-1 to 112-N as well as convert responses associated with the memory components 112-1 to 112-N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112-1 to 112-N.

The memory sub-system 110 also includes a security component 113 that facilitates secure communication with the memory sub-system 110. The security component 113 can be included in the controller 115 or any one or more of the memory components 112-1 to 112-N. In some embodiments, the controller 115 includes at least a portion of the security component 113. For example, the controller 115 can include the processor 117 (processing device) configured to execute instructions stored in the local memory 119 for performing the operations described herein. In some embodiments, the security component 113 is part of the host system 120, an application, or an operating system.

The security component 113 can further include a key store 109 to store one or more cryptographic keys used by the security component 113 to encrypt and/or verify information. For example, the key store 109 can store a root public key used by the security component 113 to encrypt information or verify information signed using a corresponding root private key. In some embodiments, the key store 109 is implemented within a local memory of the memory sub-system controller 115 (e.g., the local memory 119). In some embodiments, the key store 109 is implemented within one or more of the memory components 112-1 to 112-N. The key store 109 can be implemented within a non-volatile memory such that cryptographic keys stored therein are not lost upon system reboot.

The security component 113 can receive a request from the host system 120 to use a new public key in cryptographic operations. Responsive to the request, the security component 113 provides a challenge to the host system 120 that includes the root public key, the new public key included in the request, and a random number. In some embodiments, the challenge can further include device specific information. Each challenge generated by the security component 113 is unique to the request. Before using the new public key, the security component 113 receives two digital signatures based on the challenge. A first digital signature is generated by signing the challenge using the root private key and a second digital signature is generated by signing the challenge using a new private key corresponding to the new public key. The first signature validates that the new public key is an authorized key (e.g., authorized by the OEM) while the second signature validates that the requesting user has possession of the new private key. Upon receiving and validating the two signatures, the security component 113 can copy the new public key to memory and use it in one or more cryptographic operations.

The security component 113 can communicate with the host system 120 via the physical host interface or a native sideband communication port (e.g., a Universal Asynchronous Receiver/Transmitter (UART) port or other serial communication port that supports two-way communication) that can be specially configured as a diagnostic or maintenance port.

Figure 2:
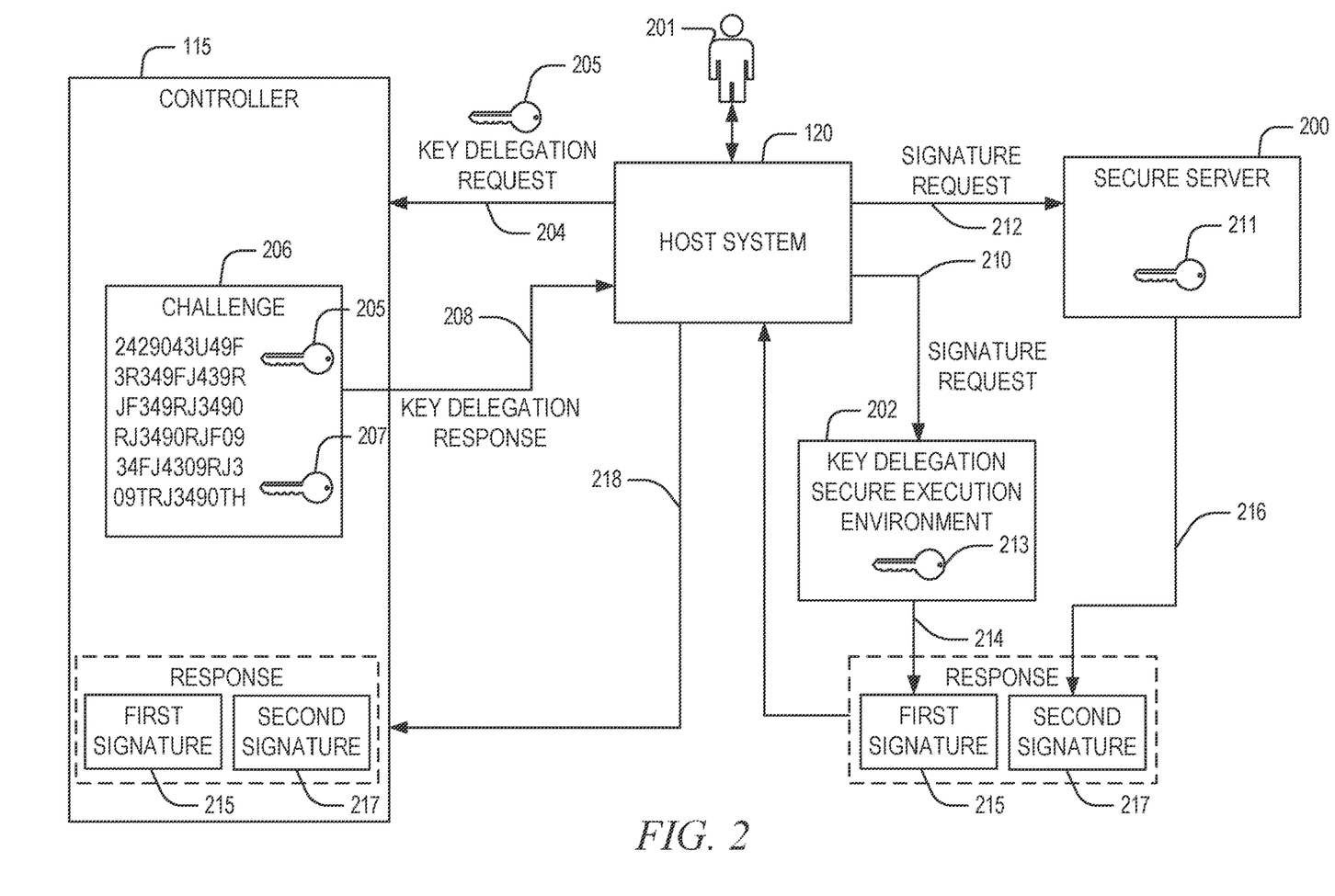
FIG. 2 is a data flow diagram illustrating interactions between components in a secure communication environment in performing an example method for delegation of a cryptographic key, in accordance with some embodiments of the present disclosure.

FIG. 2 is a data flow diagram illustrating interactions between components in a secure communication environment in performing an example method for delegation of a cryptographic key, in accordance with some embodiments of the present disclosure. In the context of FIG. 2, an initial asymmetric encryption key pair—a root public key 207 and a root private key 211—can be pre-generated, and the security component 113 can be provisioned with the root public key 207, while a secure server 200 is provisioned with the root private key 211. The security component 113 stores the root public key 207 in the key store 109. The secure server 200 comprises an HSM to store the root private key 211. Additionally, in the context of FIG. 2, a new asymmetric key pair—a new public key 205 and a new private key 213 can be generated. The new public key 205 is to be delegated to the security component 113 in the manner described below, and the new private key 213 is stored by a key delegation secure execution environment 202.

In some embodiments, the key delegation secure execution environment 202 can be or include a smart card. A smart card is a device that includes embedded circuitry to perform one or more functions and includes an internal memory to store at least the private key. The smart card can connect to a reader component (not shown) with direct physical contact or with a remote contactless radio frequency interface. The reader component can read information from the smart card and communicate with the host system 120 via an interface. For example, the memory sub-system 110 can include an API that allows the reader component to exchange information with the memory sub-system 110. In some embodiments, a user may need to supply a personal identification number (PIN) to the smart card in order to access information stored by the smart card such as the private key. In embodiments in which a smart card is utilized to store the private key, the multi-factor authentication process binds the memory sub-system 110 to a particular user—the user to which the smart card is assigned. Consistent with these embodiments, the memory sub-system 110 will remain in a locked state in which no data can be accessed until the smart card is read by the reader component.

In some embodiments, the key delegation secure execution environment 202 can be or comprise a portable HSM (e.g., embedded in a laptop). In some embodiments, the key delegation secure execution environment 202 can be or comprise a second secure server (e.g., the secure server 200 operated by the OEM or a secure server operated by a third-party).

As shown, at 204, the host system 120 sends a key delegation request to the controller 115. The key delegation request comprises the new public key 205 that is being delegated to the controller 115.

In response to the request, the security component 113 of the controller 115 generates a challenge 206. The challenge 206 comprises the new public key 205, the root public key 207, and a random number. The random number included in the challenge 206 is unique and differs from subsequent generated challenges. In this way, the random number ensures that the challenge 206 can only be generated by the controller 115 and prevents the challenge 206 from being reproduced by other devices. At 208, the controller 115 responds to the request from the host system 120 with the challenge 206.

At 210, a user 201 of the host system 120 (e.g., a FAE) transmits a first signature request to the key delegation secure execution environment 202 to generate a first digital signature by cryptographically signing the challenge 206 with the root private key 211. At 212, the user 201 of the host system 120 (e.g., a FAE) transmits a second signature request to the secure server 200 to generate a second digital signature by cryptographically signing the challenge 206 with the new private key 213. At 214, the key delegation secure execution environment 202 responds to the first signature request with a first digital signature 215 generated by cryptographically signing the challenge 206 with the new private key 213, and at 216, the secure server 200 responds to the second signature request with a second digital signature 217 generated by cryptographically signing the challenge 206 with the root private key 211.

At 218, the host system 120 provides the double signed challenge 206 to the controller 115. That is, the host system 120 provides the first digital signature 215 and the second digital signature 217 to the controller 115. Upon receiving the first digital signature 215 and the second digital signature 217, the controller 115 uses the new public key 205 to validate the first digital signature 215 and uses the root public key 207 to validate the second digital signature 217. Upon successful validation of both signatures, the controller 115 copies the new public key 205 to memory and subsequently uses the new public key 205 in one or more cryptographic operations. If the validation of either signature is unsuccessful, the controller 115 discards the new public key 205.

Figure 3:
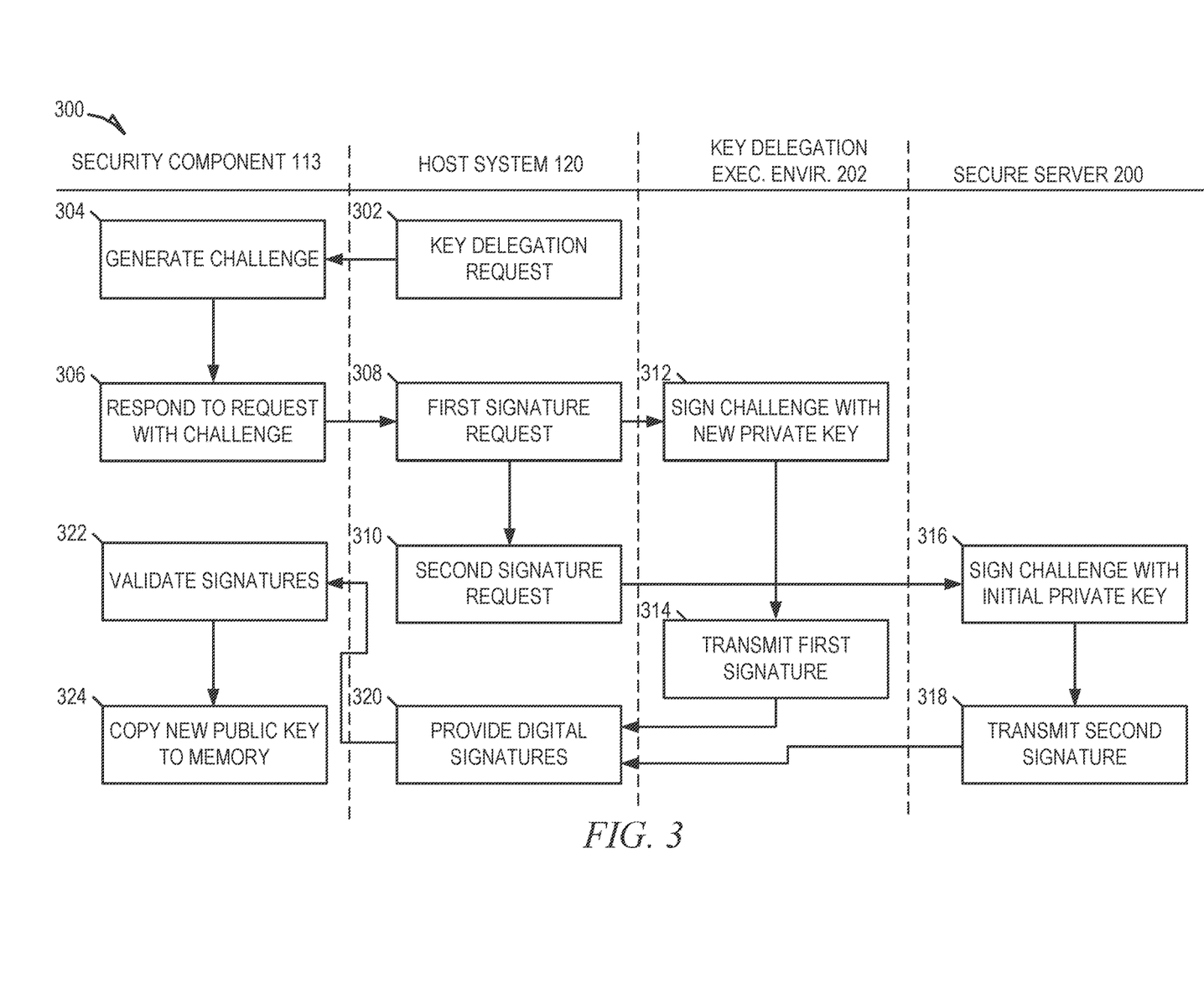
FIG. 3 is a swim lane diagram illustrating interactions between components in the secure communication environment in performing an example method for delegation of a cryptographic key, in accordance with some embodiments of the present disclosure.

FIG. 3 is a swim lane diagram illustrating interactions between components in the secure communication environment in performing an example method 300 for delegation of a cryptographic key, in accordance with some embodiments of the present disclosure. Prior to the method 300, an initial asymmetric encryption key pair—a root public key and a root private key—is pre-generated, and the security component 113 is be provisioned with the root public key, while the secure server 200 is provisioned with the root private key. The security component 113 stores the root public key in the key store 109. Additionally, a new asymmetric key pair—a new public key and a new private key—are generated. The new public key is to be delegated to the security component 113 in the manner described below, and the new private key is stored by a key delegation secure execution environment (e.g., 202).

As shown in FIG. 3, the method 300 begins at operation 302 where the host system 120 sends a key delegation request to the controller 115. The key delegation request comprises the new public key that is being delegated to the controller 115.

In response to the request, the security component 113 of the controller 115 generates a challenge at operation 304 comprising the new public key, the root public key, and a number used only once (nonce). Accordingly, in generating the challenge, the security component 113 generates the nonce and combines the nonce with the root public key and the new public key. In some embodiments, the challenge can include additional fields such as device-specific information (e.g., information describing the memory sub-system 110). The random number (and device-specific information) included in the challenge ensures that the challenge can only be generated by the controller 115 and prevents the challenge from being reproduced by other devices.

The controller 115, at operation 306, responds to the request from the host system 120 with the challenge. Upon receiving the challenge, the host system 120 sends a first signature request to the key delegation secure execution environment 202 to generate a first digital signature by cryptographically signing the challenge with the root private key 211, at operation 308. The key delegation secure execution environment 202 can be or comprise a portable HSM (e.g., embedded in a laptop), a smart card, or a secure server (e.g., the secure server 200 operated by the OEM or a secure server operated by a third-party).

In parallel with transmitting the first signature request, the host system 120 sends a second signature request at operation 310 to the secure server 200 to generate a second digital signature by cryptographically signing the challenge with the new private key. The second signature request can be transmitted via a wired or wireless network connection. The request can, for example, be received through an application programming interface (API) provided by the secure server 200.

At operation 312, the key delegation secure execution environment 202 generates a first digital signature by cryptographically signing the challenge using the new private key, and at operation 314, the key delegation secure execution environment 202 responds to the first signature request with the first digital signature.

At operation 316, the secure server 200 generates a second digital signature by cryptographically signing the challenge using the root private key, and at operation 318, the secure server 200 responds to the second signature request with the second digital signature.

The host system 120 provides the first digital signature 215 and the second digital signature 217 to the security component 113 (at operation 320). The controller 115 validates the first and second digital signatures, at operation 322. More specifically, the security component 113 uses the new public key to validate the first digital signature and uses the root public key to validate the second digital signature. As an example, in validating a digital signature, the security component 113 uses a public key to generate hash data based on the challenge, and the security component 113 decrypts the digital signature using the public key. If the hash data and the decrypted data match, the key is considered valid. Otherwise, the key is considered invalid as either a different key was used to generate the digital signature, or the underlying data used in the digital signature (e.g., the challenge) has been altered.

Upon successful validation of both signatures, the controller 115 copies the new public key to memory at operation 324. With the new public key copied to memory, the security component 113 can subsequently use the new public key in one or more cryptographic operations. In some embodiments, the new public key can be stored in volatile memory such that the new public key is discarded upon system reboot.

Figure 4:
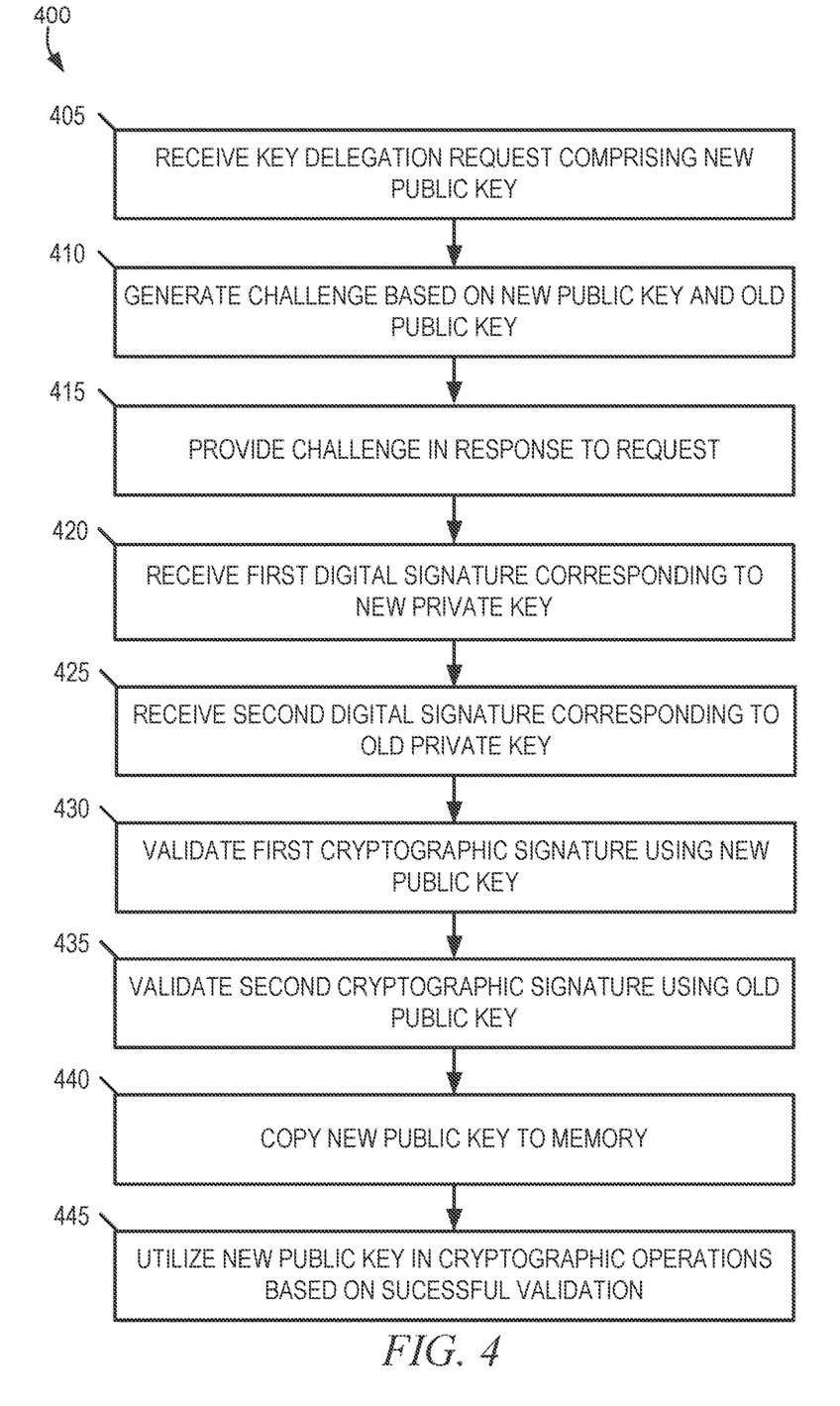
FIGS. 4 and 5 are flow diagrams illustrating an example method for delegation of a cryptographic key in a memory sub-system, in accordance with some embodiments of the present disclosure.
Figure 5:
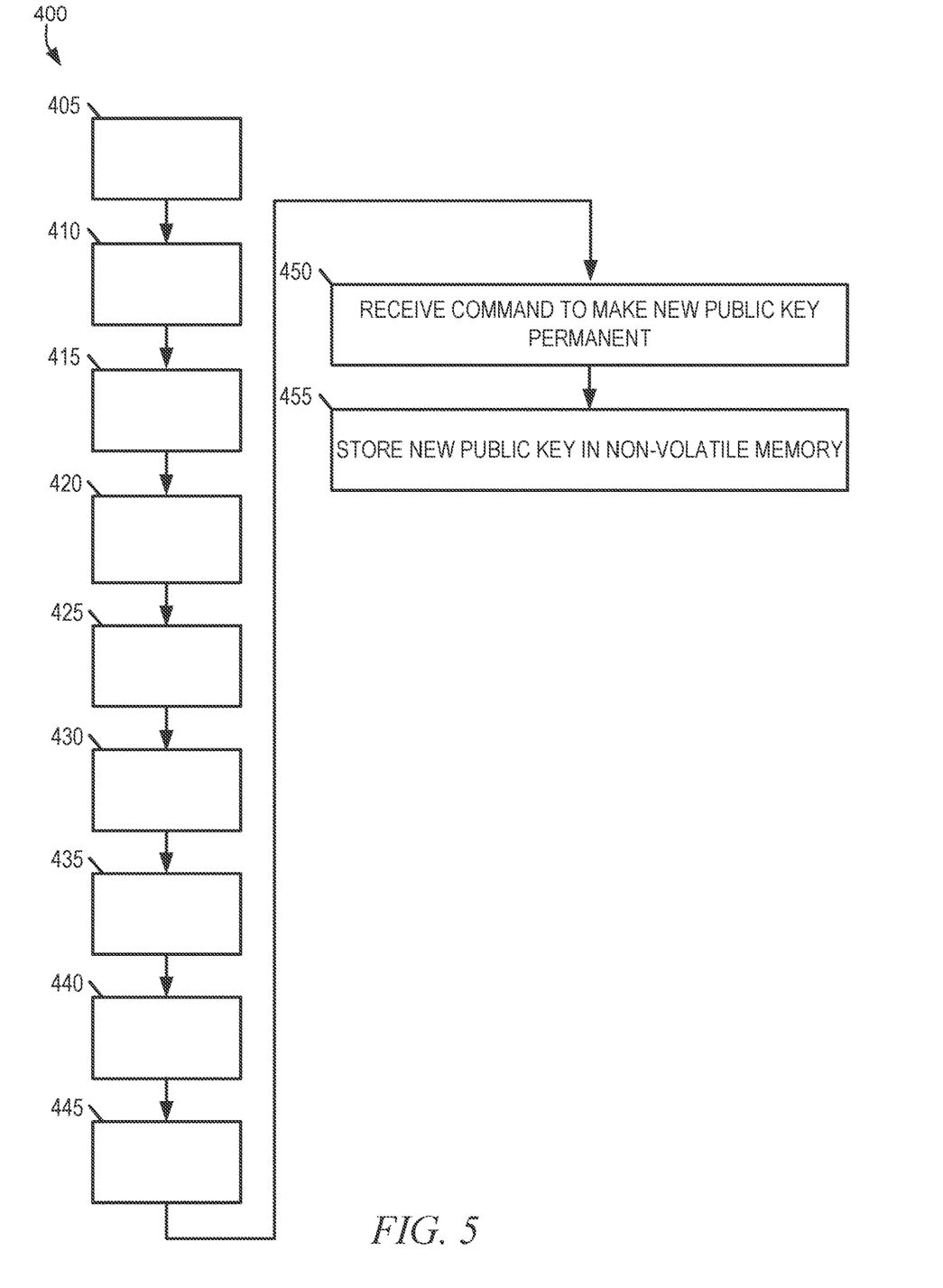

FIGS. 4 and 5 are flow diagrams illustrating an example method 400 for delegation of a cryptographic key in a memory sub-system, in accordance with some embodiments of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the security component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device receives a key delegation request. The key delegation request includes a new public key. The request can be received from the host system 120. In some embodiments, receiving the request includes receiving one or more commands from the host system via a host system interface. In some embodiments, receiving the request includes receiving the request from the host system via a communication port (e.g., a UART port or other serial communication port that supports two-way communication).

The processing device, at operation 410, generates a challenge in response to receiving the request. The generating of the challenge includes generating a nonce and combining the nonce with the new public key and a root public key stored by the processing device. The root public key can be provisioned to the processing device during manufacturing and stored in a key store (e.g., key store 109). The nonce comprises a random number. Accordingly, the generating of the nonce includes generating a random number. The processing device can generate the random number using one of many known random number generators. In some embodiments, the challenge can include additional fields that include certain device specific information. The random number included in the challenge ensures that the challenge can only be generated by the controller 115 and prevents the challenge from being reproduced by other devices. Given that the random number is also a unique number used only once, the random number also protects against replay of a previously signed challenge.

At operation 415, the processing device provides the challenge in response to the request. For example, the processing device can return the challenge to the host system 120 in response to a request received from the host system 120.

The processing device receives a first digital signature generated by cryptographically signing the challenge with a new private key associated with the new public key (at operation 420). That is, the new private key and the new public key form an asymmetric key pair.

The processing device, at operation 425, receives a second digital signature generated by cryptographically signing the challenge with a root private key associated with the root public key. That is, the root private key and the root public key form an asymmetric key pair.

At operation 430, the processing device validates the first digital signature using the new public key. For example, the processing device can compute a first hash of the challenge using the new public key, decrypt the first digital signature using the new public key, and compare the first hash to the decrypted data. If the two values match (e.g., the first hash and the decrypted data are identical), the validation of the first digital signature is successful. If they match, the signature is considered valid. If values do not match, it either means that a different key was used to generate the first signature, or the challenge has been altered (either intentionally or unintentionally). Thus, if there is a difference between the two values, the validation fails.

The processing device validates the second digital signature using the root public key (at operation 435). For example, the processing device can compute a second hash of the challenge using the root public key, decrypt the second digital signature using the root public key, and compare the second hash to the decrypted data. As with the first digital signature, if the two values match, the validation of the first digital signature is successful. Otherwise, the validation fails.

The processing device, at operation 440, copies the new public key to memory based on successful validation of both the digital signatures. In an example, the processing device stores the new pubic key in a volatile memory component such that an interruption in power to the processing device causes the new public key to be lost.

At operation 445, the processing device utilizes the new public key in a cryptographic operation based on successful validation of both the first and second digital signatures. For example, the processing device can use the new public key to encrypt information.

As shown in FIG. 5, the method 400 can, in some embodiments, include operations 450 and 455. Consistent with these examples, the processing device stores the new public key in a volatile memory component at operation 440. At operation 450, the processing device receives a command to make the new public key permanent. The command can be received from the host system 120 via a host system interface. Based on receiving the command, the processing device stores the new public key in a non-volatile memory component such that the new public key is maintained upon system reboot, in operation 455. As an example, the processing device can store the new public key in the key store 109. Some example systems are set out below.

Example 1 is a system comprising: a memory component; and a memory sub-system controller, operatively coupled with the memory component, to perform operations comprising: receiving, from a host system, a key delegation request comprising a new public key; based on receiving the request, generating a challenge based on the new public key and a root public key; providing the challenge to the host system responsive to the key delegation request; receiving, from the host system, a first digital signature generated by cryptographically signing the challenge with a new private key corresponding to the new public key; receiving, from the host system, a second digital signature generated by cryptographically signing the challenge with a root private key corresponding to the root public key; validating the first digital signature using the new public key; validating the second digital signature using the root public key; and utilizing the new public key in one or more cryptographic operations based on validating the first and second digital signatures.

In Example 2, the system of Example 1 optionally comprises a volatile memory component, and the operations of Example 1 optionally comprise copying the new public key to the volatile memory component based on validating the first and second digital signatures.

In Example 3, the system of any one of Examples 1-2 optionally comprises a non-volatile memory component to store the root public key, and the operations of any one of Examples 1-2 optionally comprise receiving, from the host system, a command to make the new public key permanent; and based on the command, storing the new public key in the non-volatile memory component.

In Example 4, the challenge of any one of Examples 1-3 optionally comprises a nonce, the new public key, and the root public key.

In Example 5, the generating of the challenge in any one of Examples 1-4 optionally comprises: generating the nonce, the nonce comprising a random number; and combining the nonce, the new public key, and the root public key.

In Example 6, the subject matter of any one of Examples 1-5 optionally comprises a secure server to store the root private key and a secure execution environment to store the new private key.

In Example 7, the subject matter of any one of Examples 1-6 optionally comprises a secure server comprising a hardware security module (HSM) and a secure execution environment comprising one of: a portable HSM, a smart card, or a second secure server.

In Example 8, the operations of any one of Examples 1-7 optionally comprises: generating, using the new public key, first hash data based on the challenge; decrypting the first digital signature using the new public key, the decrypting of the first digital signature resulting in first decrypted data; and comparing the first hash data to the first decrypted data; generating, using the root public key, second hash data based on the challenge; decrypting the second digital signature using the root public key, the decrypting of the second digital signature resulting in second decrypted data; and comparing the second hash data to the second decrypted data.

In Example 9, the system of any one of Examples 1-8 optionally comprises a key store comprising a memory to store the root public key.

In Example 10, the system of any one of Examples 1-9 optionally comprises a host interface, wherein the key delegation request, the first digital signature, and the second digital signature are received via the host interface.

Example 11 is a method comprising: receiving, from a host system, a key delegation request comprising a new public key; based on receiving the request, generating, by one or more hardware processors, a challenge based on the new public key and a root public key; providing the challenge to the host system responsive to the key delegation request; receiving, from the host system, a first digital signature generated by cryptographically signing the challenge with a new private key corresponding to the new public key; receiving, from the host system, a second digital signature generated by cryptographically signing the challenge with a root private key corresponding to the root public key; validating, by the one or more hardware processors, the first digital signature using the new public key; validating, by the one or more hardware processors, the second digital signature using the root public key; and utilizing the new public key in one or more cryptographic operations based on validating the first and second digital signatures.

In Example 12, the method of Example 11 optionally comprises copying the new public key to a volatile memory component based on validating the first and second digital signatures.

In Example 13, the method of any one of Examples 11 and 12 optionally comprises: receiving, from the host system, a command to make the new public key permanent; and based on the command, storing the new public key in the non-volatile memory component.

In Example 14, the challenge of any one of Examples 11-13 optionally comprises: a nonce, the new public key, and the root public key.

In Example 15, the generating of the challenge in any one of Examples 11-14 optionally comprises: generating the nonce, the nonce comprising a random number; and combining the nonce, the new public key, and the root public key.

In Example 16, the subject matter of any one of Examples 11-15 optionally comprises a secure server to store the root private key and a secure execution environment to store the new private key.

In Example 17, the subject matter of any one of Examples 11-16 optionally comprises a secure server comprising a hardware security module (HSM) and a secure execution environment comprising one of: a portable HSM, a smart card, or a second secure server.

In Example 18, the method of any one of Examples 11-17 optionally comprises generating, using the new public key, first hash data based on the challenge; decrypting the first digital signature using the new public key, the decrypting of the first digital signature resulting in first decrypted data; and comparing the first hash data to the first decrypted data; generating, using the root public key, second hash data based on the challenge; decrypting the second digital signature using the root public key, the decrypting of the second digital signature resulting in second decrypted data; and comparing the second hash data to the second decrypted data.

In Example 19, the one or more hardware processors of any one of Examples 11-18 optionally correspond to a memory sub-system controller.

Example 20 is A non-transitory computer-readable storage medium comprising instructions that, when executed by a processing device, configure the processing device to perform operations comprising: receiving, from a host system, a key delegation request comprising a new public key;

based on receiving the request, generating a challenge based on the new public key and a root public key; providing the challenge to the host system responsive to the key delegation request; receiving, from the host system, a first digital signature generated by cryptographically signing the challenge with a new private key corresponding to the new public key; receiving, from the host system, a second digital signature generated by cryptographically signing the challenge with a root private key corresponding to the root public key; validating the first digital signature using the new public key; validating the second digital signature using the root public key; and utilizing the new public key in one or more cryptographic operations based on validating the first and second digital signatures.

Figure 6:
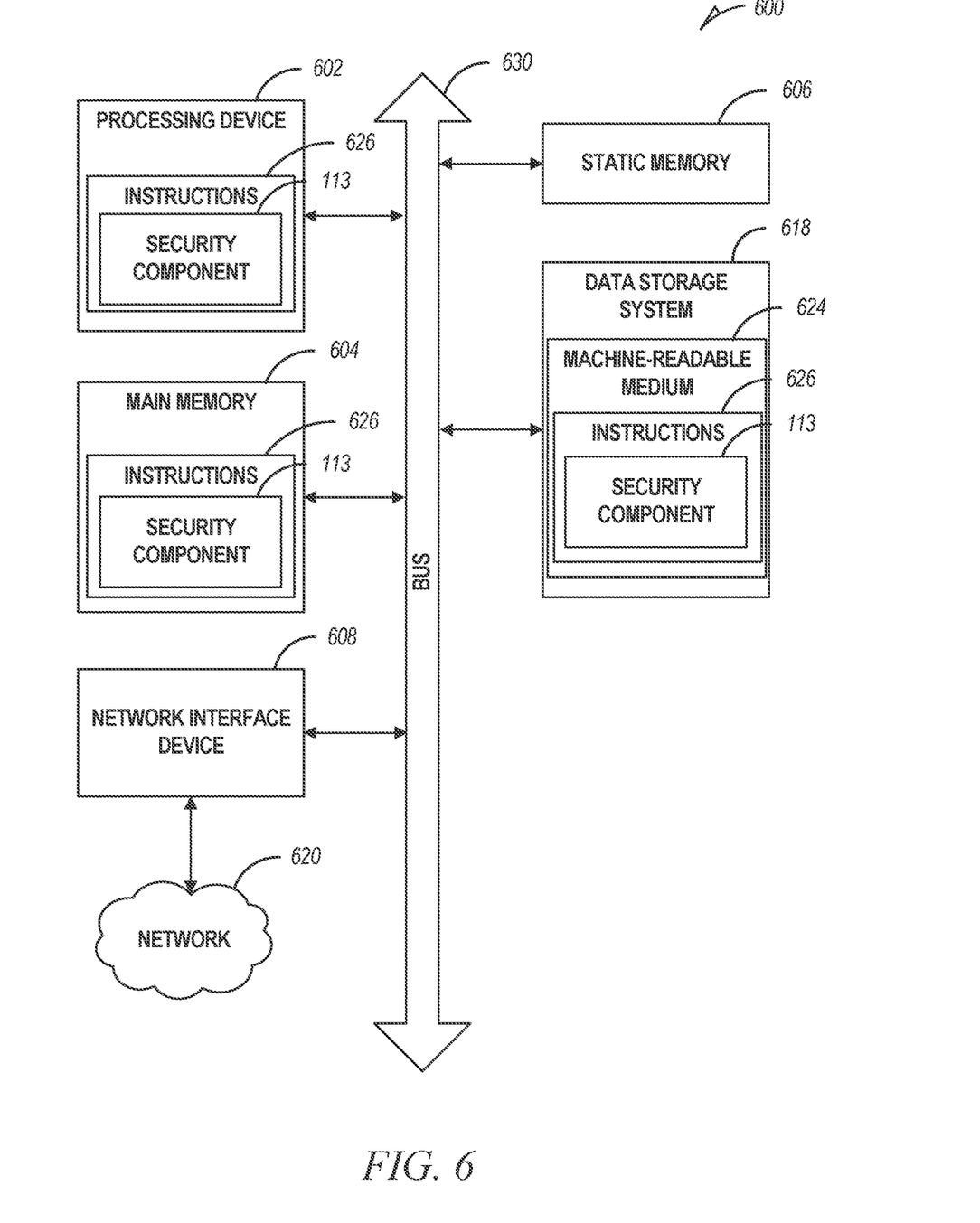
FIG. 6 is a block diagram of an example computer system in which embodiments of the present disclosure can operate.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the security component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or Rambus DRAM (RDRAM), etc.), a static memory 606 (e.g., flash memory, static random-access memory (SRAM), etc.), and a data storage system 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an ASIC, an FPGA, a digital signal processor (DSP), a network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a security component (e.g., the security component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; ROMs; RAMs; erasable programmable read-only memories (EPROMs); EEPROMs;

magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., a computer-readable) storage medium such as a ROM, a RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A system comprising:
    a memory component; and
    a memory sub-system controller, operatively coupled with the memory component, to perform operations comprising:
    receiving a key delegation request comprising a new public key;
    based on receiving the key delegation request, generating a challenge comprising a combination of a nonce, the new public key, and a root public key;
    validating, using the new public key, a first digital signature generated by cryptographically signing the challenge with a new private key corresponding to the new public key;
    validating, using the root public key, a second digital signature generated by cryptographically signing the challenge with a root private key corresponding to the root public key; and
    copying the new public key to the memory component based on validating the first digital signature and the second digital signature.

2. The system of claim 1, wherein the operations further comprise utilizing the new public key in one or more cryptographic operations based on validating the first and second digital signatures.

3. The system of claim 1, wherein the operations further comprise receiving a command to make the new public key permanent, wherein the copying of the new public key to the memory component is based on receiving the command.

4. The system of claim 1, wherein the challenge further comprises device-specific information describing one or more components of the system.

5. The system of claim 1, wherein the generating of the challenge further comprises:
    generating the nonce, the generating of the nonce comprising generating a random number.

6. The system of claim 1, wherein:
    a secure server stores the root private key; and
    a secure execution environment stores the new private key.

7. The system of claim 6, wherein:
    the secure server comprises a hardware security module (HSM); and
    the secure execution environment comprises one of: a portable HSM, a smart card, or a second secure server.

8. The system of claim 1, wherein:
    the validating of the first digital signature using the new public key comprises:
    generating, using the new public key, first hash data based on the challenge;
    decrypting the first digital signature using the new public key, the decrypting of the first digital signature resulting in first decrypted data; and
    comparing the first hash data to the first decrypted data;
    the validating of the second digital signature using the root public key comprises:
    generating, using the root public key, second hash data based on the challenge;
    decrypting the second digital signature using the root public key, the decrypting of the second digital signature resulting in second decrypted data; and
    comparing the second hash data to the second decrypted data.

9. The system of claim 1, further comprising a key store comprising a memory to store the root public key.

10. The system of claim 1, further comprising a host interface, wherein the key delegation request, the first digital signature, and the second digital signature are received via the host interface.

11. A method comprising:
    receiving a key delegation request comprising a new public key;
    based on receiving the key delegation request, generating, by one or more hardware processors, a challenge comprising a combination of a nonce, the new public key, and a root public key;
    validating, using the new public key, a first digital signature generated by cryptographically signing the challenge with a new private key corresponding to the new public key;
    validating, using the root public key, a second digital signature generated by cryptographically signing the challenge with a root private key corresponding to the root public key; and
    copying the new public key to a memory component based on validating the first digital signature and the second digital signature.

12. The method of claim 11, further comprising utilizing the new public key in one or more cryptographic operations based on validating the first and second digital signatures.

13. The method of claim 11, further comprising receiving a command to make the new public key permanent, wherein the copying of the new public key to the memory component is based on receiving the command.

14. The method of claim 11, wherein the challenge further comprises device-specific information describing one or more components of a memory device.

15. The method of claim 11, wherein the generating of the challenge further comprises:
generating the nonce, the nonce generating of the nonce comprising generating a random number.

16. The method of claim 11, wherein:
a secure server stores the root private key; and
a secure execution environment stores the new private key.

17. The method of claim 16, wherein:
the secure server comprises a hardware security module (HSM); and
the secure execution environment comprises one of: a portable HSM, a smart card, or a second secure server.

18. The method of claim 17, wherein:
the validating of the first digital signature using the new public key comprises:
generating, using the new public key, first hash data based on the challenge;
decrypting the first digital signature using the new public key, the decrypting of the first digital signature resulting in first decrypted data; and
comparing the first hash data to the first decrypted data;
the validating of the second digital signature using the root public key comprises:
generating, using the root public key, second hash data based on the challenge;
decrypting the second digital signature using the root public key, the decrypting of the second digital signature resulting in second decrypted data; and
comparing the second hash data to the second decrypted data.

19. The method of claim 11, wherein the one or more hardware processors correspond to a memory sub-system controller.

20. A non-transitory computer-readable storage medium comprising instructions that, when executed by a processing device, configure the processing device to perform operations comprising:
receiving a key delegation request comprising a new public key;
based on receiving the key delegation request, generating a challenge comprising a combination of a nonce, the new public key, and a root public key;
validating, using the new public key, a first digital signature generated by cryptographically signing the challenge with a new private key corresponding to the new public key;
validating, using the root public key, a second digital signature generated by cryptographically signing the challenge with a root private key corresponding to the root public key; and
copying the new public key to a memory component based on validating the first digital signature and the second digital signature.

* * * * *